United States Patent
Spencer, III et al.

(10) Patent No.: US 6,436,359 B1
(45) Date of Patent: Aug. 20, 2002

(54) METHOD FOR CONTROLLING THE PRODUCTION OF AMMONIA FROM UREA FOR $NO_x$ SCRUBBING

(75) Inventors: Herbert W. Spencer, III, Valencia, CA (US); Harold James Peters, Doylestown, PA (US)

(73) Assignee: EC&C Technologies, Inc., La Canada-Flintridge, CA (US)

( * ) Notice: Subject to any disclaimer, the term of this patent is extended or adjusted under 35 U.S.C. 154(b) by 0 days.

(21) Appl. No.: 09/697,263

(22) Filed: Oct. 25, 2000

(51) Int. Cl.[7] .............................................. B01D 53/56
(52) U.S. Cl. ..................... 423/235; 423/239.1; 423/358
(58) Field of Search ............................. 423/212, 213.2, 423/235, 239.1, 358

(56) References Cited

U.S. PATENT DOCUMENTS

| | | | |
|---|---|---|---|
| 4,719,092 A | 1/1988 | Bowers | 423/235 |
| 4,751,065 A | 6/1988 | Bowers | 423/235 |
| 4,851,201 A | 7/1989 | Heap et al. | 423/235 |
| 4,906,447 A | 3/1990 | Schwarzenbek | 423/358 |
| 4,927,612 A | 5/1990 | Bowers | 423/235 |
| 5,047,220 A | 9/1991 | Polcer | 423/239 |
| 5,058,514 A | 10/1991 | Mozes et al. | 110/345 |
| 5,098,680 A | 3/1992 | Fellows et al. | 423/235 |
| 5,116,584 A | 5/1992 | Chen et al. | 423/235 |
| 5,118,481 A | 6/1992 | Lyon | 423/235 |
| 5,165,903 A | 11/1992 | Hunt et al. | 423/239 |
| 5,237,939 A | 8/1993 | Spokoyny et al. | 410/345 |
| 5,240,688 A | 8/1993 | von Harpe et al. | 423/235 |
| 5,270,025 A | 12/1993 | Ho et al. | 423/235 |
| 5,281,403 A | 1/1994 | Jones | 423/235 |
| 5,399,325 A | 3/1995 | von Harpe et al. | 423/235 |
| 5,478,542 A | 12/1995 | Chawla et al. | 423/235 |
| 5,543,123 A | 8/1996 | Hofmann et al. | 423/235 |
| 5,827,490 A | 10/1998 | Jones | 423/239.1 |
| 5,943,865 A | 8/1999 | Cohen | 60/653 |
| 5,976,475 A | 11/1999 | Peter-Hoblyn et al. | 423/212 |
| 5,985,224 A | 11/1999 | Lagana | 423/235 |
| 6,017,503 A | 1/2000 | Kato et al. | 423/235 |
| 6,048,510 A | 4/2000 | Zauderer | 423/235 |
| 6,051,040 A | 4/2000 | Peter-Hoblyn | 44/358 |
| 6,077,491 A | 6/2000 | Cooper et al. | 423/235 |
| 6,093,380 A | 7/2000 | Lagana et al. | 423/239.1 |

Primary Examiner—Steven P. Griffin
Assistant Examiner—Maribel Medina
(74) Attorney, Agent, or Firm—Joseph E. Mueth

(57) ABSTRACT

A process to provide a pressurized gas stream useful for removing nitrogen oxides from a combustion gas stream by hydrolyzing urea in aqueous solution in a closed reactor to evolve gaseous ammonia at a rate essentially balanced to the amount required from the combustion gas stream. The improvement resides in maintaining the pressure in the reactor within a preselected range when the demand for ammonia for external use suddenly drops by cooling the solution within the hydrolysis reactor by heat exchange either within or external to the reactor in response to rapid changes in demand for ammonia required to remove said nitrogen oxides.

20 Claims, 5 Drawing Sheets

Overpressure curve — emergency gas shut off

With water cooling and with selected operating temperature initial pressure and gas to liquid volumes to limit overpressure during instantaneous shutoff of the gas take-off.

FIG. 3 Over Pressure Plot (As a Function of Fill Height and Cooling Duty)

METHOD FOR CONTROLLING THE PRODUCTION OF AMMONIA FROM UREA FOR NO$_x$ SCRUBBING

BACKGROUND OF INVENTION

According to U.S. Pat. No. 6,077,491, the disclosure of which is expressly incorporated by reference, an aqueous solution of urea is converted to a gaseous product stream of ammonia and carbon dioxide at a rate which is essentially matched to the amount of ammonia required for the removal of nitrogen oxides from combustion gas streams by the SCR or SNCR NO$_x$ control methods. This process generally conforms to the following general operating conditions.

An aqueous solution of urea or mixtures of urea and urea precursors having a concentration of about 1% to about 76% by weight of solids is fed into a reactor. The urea therein is hydrolyzed at temperatures of at least 110° C. up to about 300° C. and under pressures of about 20–500 psig, the temperature or pressure of the reaction mixture being controlled by the input of heat to produce a gaseous product stream of ammonia, carbon dioxide and water. The heat input is maintained at a level rate sufficient to meet the demands for ammonia which is equal to that required to reduce essentially all of the nitrogen oxides present in the combustion gas stream.

It is essential that the amount of ammonia injected into the combustion gas stream be carefully balanced to the amount required to scrub out the nitrogen oxides. If excess ammonia is injected, it can be discharged from the combustion gas stack, creating a hazard. The problem of ammonia slip has been recognized, for example, in Bowers U.S. Pat. No. 4,719,092, Fellows U.S. Pat. No. 5,098,680 and Spokoyny U.S. Pat. No. 5,237,939. However, none of these patents relate to the scrubbing of nitrogen oxides (NO$_x$) from stack gas by the injection of ammonia gas continuously generated from an aqueous urea solution.

According to the above referred to patent, the hydrolysis reactor pressure is controlled by the heat input to a hydrolysis reactor and the gas takeoff rate is controlled by an adjustable control valve, which adjusts to match the required amount for removal of the nitrogen oxides in the combustion gas streams. Emergency pressure relief can be on either the gas side or the liquid side of the reactor. In both cases, a vent can be provided which is connected to a water containing dump tank which serves to trap ammonia gas and prevent its release to the atmosphere. Cool water in the dump tank serves to stop the hydrolysis process and prevent further generation of ammonia.

SUMMARY OF INVENTION

This invention comprises an improved process to provide a pressurized gas stream useful for removing nitrogen oxides from a combustion gas stream which includes the steps of
(a) hydrolyzing urea in aqueous solution in a closed reactor to evolve gaseous ammonia at a rate essentially balanced to the amount required to remove nitrogen oxides from the combustion gas stream; and
(b) contacting said gaseous ammonia with said combustion gas stream;
the improvement wherein the pressure in the reactor is maintained within a pre-selected range when the demand for ammonia required for nitrogen oxide removal suddenly drops by cooling the solution within the hydrolysis reactor by heat exchange either within or external to the reactor in response to rapid changes in demand for ammonia required to remove said nitrogen oxides.

This invention relates to an improved process to provide a pressurized gas stream useful for removing nitrogen oxides from a combustion gas stream by SNCR (Selective Non-Catalytic Reduction), or SCR (Selective Catalytic Reduction), which comprises the steps of:
a) feeding an aqueous solution of urea or mixtures of urea containing biuret and/or ammonium carbamate, having a concentration of about 1% to about 76% by weight of solids into a reactor and hydrolyzing the urea therein at temperatures of at least 110° C. up to about 300° C. and under pressures of about 20–500 psig, the temperature or pressure of the reaction mixture normally being controlled by the input of heat to the reactor to produce a gaseous product stream of ammonia, carbon dioxide and water at a rate sufficient for external use in step d), and a residual liquid phase reaction medium containing unreacted urea, biuret and/or ammonium carbamate;
b) separating the gaseous product stream at a controlled pressure and flow rate;
c) retaining the liquid phase reaction medium in the reactor for further conversion to gaseous ammonia and carbon dioxide, and/or recycling at least a portion of the reaction medium back into the reactor, a urea dissolver, or the feed solution to the reactor for further conversion; and
d) withdrawing the gaseous ammonia and carbon dioxide-containing product stream and feeding it for external use at a controlled rate which is approximately the amount necessary for the demands of said external use in removing said nitrogen oxides;
the improvement wherein the pressure in the reactor is maintained within the recited range when the demand for ammonia for said external use suddenly drops by cooling the solution within the hydrolysis reactor by heat exchange either within or external to the reactor in response to rapid changes in demand for ammonia required to remove said nitrogen oxides.

DESCRIPTION OF PREFERRED EMBODIMENTS

In the process of this invention, an aqueous solution of urea is converted to a gaseous product stream of ammonia and carbon dioxide for use in the removal of nitrogen oxides from combustion gas streams by the SCR or SNCR NO$_x$ control methods. The solution of urea is provided at a specific concentration and is pumped into a hydrolysis reactor at a controlled rate. The reaction is endothermic and heat is required. The heat input to the reactor is controlled to maintain a constant gas pressure in the reactor. In the reaction, the urea first hydrolyzes to ammonium carbamate from which the gaseous ammonia-carbon dioxide product mixture is formed and then fed at a controlled rate to the distribution grid in the combustion gas duct. For some applications, the gas mixture is diluted with air, steam or combustion gas to improve mixing and contact with the nitrogen oxides in the combustion gas stream. The gas flow is adjusted to match the ammonia rate with the NO$_x$ in the combustion gas stream.

The reaction in the reactor is:

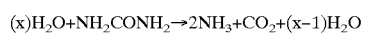

The rate of generation of ammonia by this reaction is given by the Arrenhius equation. Thus the rate of ammonia generation $=Ae^{-b/kT}$ where A is proportional to the number of moles of water and urea and b is the free energy for the reaction. Controlling the amount of urea solution in the reactor and the temperature of the reactor controls the generation rate of ammonia. Below about 110° C., the reaction does not occur unless a catalyst is used. The invention contemplates the use of catalysts which allow temperatures below 110° C. In the process, the temperature is self-regulated by controlling the heat input into the reactor to maintain a constant pressure. The rate of increase in ammonia generation can be rapid since it is only necessary to provide access heat input to increase the temperature of the reactor. Increasing the reactor temperature from 140° C. to 158° C. increases the ammonia generation by 300%.

The rate of $NO_x$ reduction with ammonia produced from urea is the same as with neat ammonia. The SAR process equations are:

Removal of $NO_x$ by Ammonia:

$$4NO+4NH_3+O_2 \rightarrow 4N_2+6H_2O$$

$$2NO_2+4NH_3+O_2 \rightarrow 3N_2+6H_2O$$

Removal of $NO_x$ by Urea:

$$4NO+2CO(NH_2)_2+O_2 \rightarrow 4N_2+4H_2O+2CO_2$$

$$2NO_2+2CO(NH_2)_2+O_2 \rightarrow 3N_2+4H_2O+2CO,$$

The urea solution can be used in the concentration range of about 1 to 76%, and preferably is operated at a 40% or 50% urea concentration, which is fed to the reactor with a positive displacement type pump. The urea solution is pumped to the hydrolysis reactor at a controlled rate to maintain a constant level in the reactor. The reactor liquid level is monitored with a differential pressure transmitter/controller, which controls the reactor feed rate, to maintain a constant liquid level in the reactor. The feed rate is controlled either with a proportioning pump or by controlling the rate of take off from a constant speed pump equipped with a re-circulation line.

The generation of ammonia at a controlled rate by hydrolysis of urea has been developed for the control of $NO_x$ emissions with SNCR and SCR system. In the process heat is applied to drive the hydrolysis reaction. In normal operations the demand for heat input is adjusted to meet production requirements. One means to control the heat input is to monitor the pressure in the reaction vessel and adjust the heat to maintain a constant gas pressure as disclosed in the above-identified patent application. As additional ammonia is required, heat is added. As the ammonia requirement decreases, the heat addition is reduced and the heat stored in the reactor solution and reactor vessel is used up as the temperature of the solution decreases to meet the new demand requirement. However, in the case of a sudden or instantaneous decrease in the demand for ammonia, such as occurs when the amount of oil, coal or gas being charged to the boiler of a power plant is rapidly cut back, the heat stored in the hot reactor solution and in the reactor vessel will continue to generate ammonia, excessively increasing the pressure in the reactor vessel until the temperature of the solution is lowered to below the generation point for ammonia and the hydrolysis reaction stops. To limit this pressure build-up, solution or gas must be discharged from the vessel unless the temperature of the solution and vessel are reduced. However, withdrawal of hot solution or gas presents major problems which this invention avoids.

BRIEF DESCRIPTION OF THE DRAWINGS

In FIGS. 1 and 2, the pressure in the reactor vessel is shown where no cooling is applied to the aqueous urea solution being hydrolyzed in the pressure reactor (FIG. 1), and where the steam in the heating system of the hydrolysis reactor is replaced with cooling water (FIG. 2). By selecting the appropriate cooling transfer area, for the hydrolysis solution, the system can be designed according to this invention so that with an instantaneous stoppage of the ammonia demand, the pressure build up the vessel can be controlled and more economical lower pressure reactor vessel designs can be used without the need to allow for either gas or liquid withdrawal from the reactor which could result in the unwanted and dangerous release of ammonia to the atmosphere.

FIG. 1 shows that when the hydrolysis reactor has no cooling according to this invention and an instantaneous stoppage of ammonia demand occurs, the temperature of the hydrolysis solution (T) drops very slowly, lower curve of FIG. 1, while the pressure (P) within the reactor continues to rise rapidly due to the latent heat in the hydrolysis solution, FIG. 1, upper curve.

Figure 1:
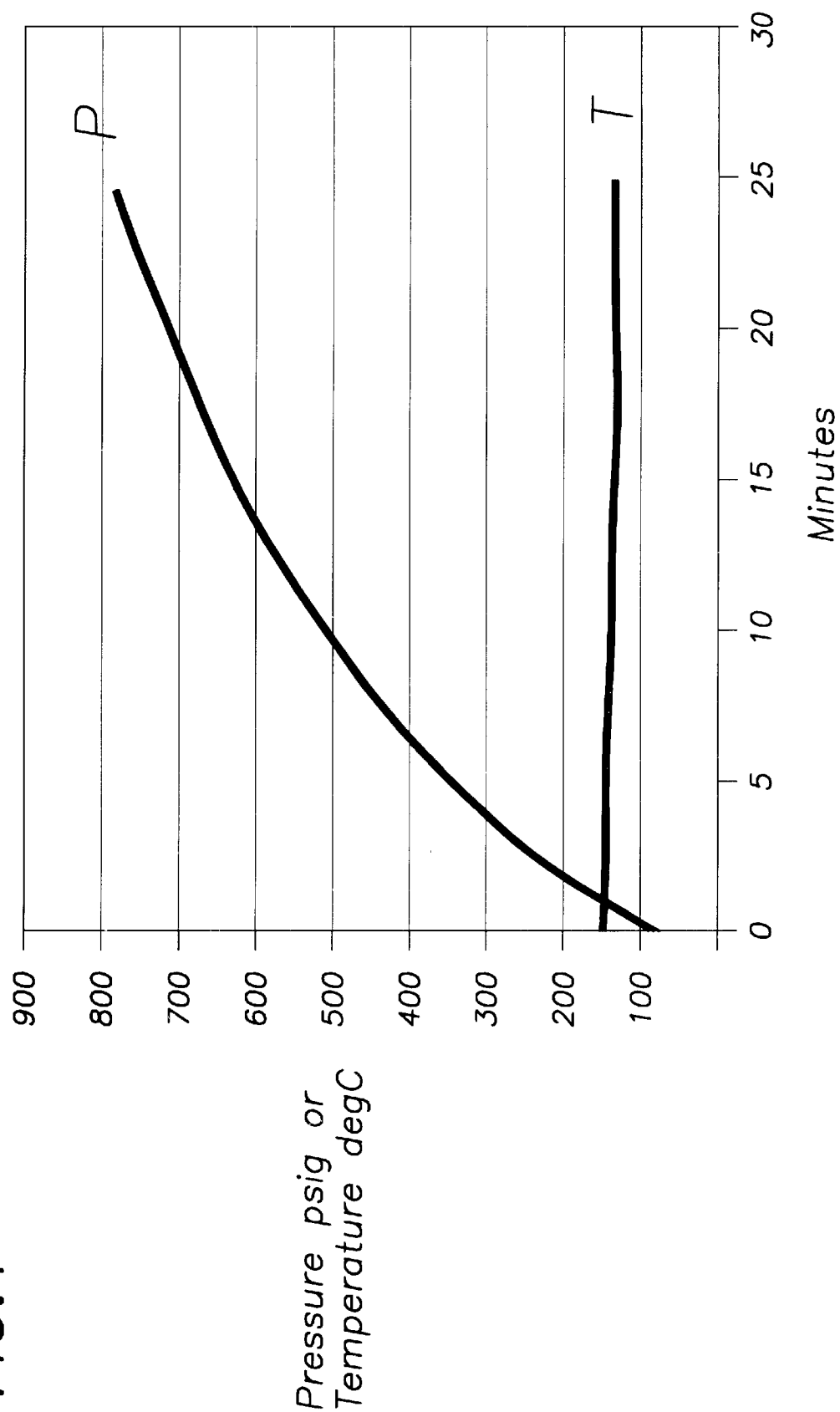
FIG. 1 is a graph showing the pressure and temperature relationships with time in the hydrolysis reactor when an instantaneous stoppage of ammonia demand occurs and the urea hydrolysis solution in the reactor is not rapidly cooled by heat exchange.
Figure 2:
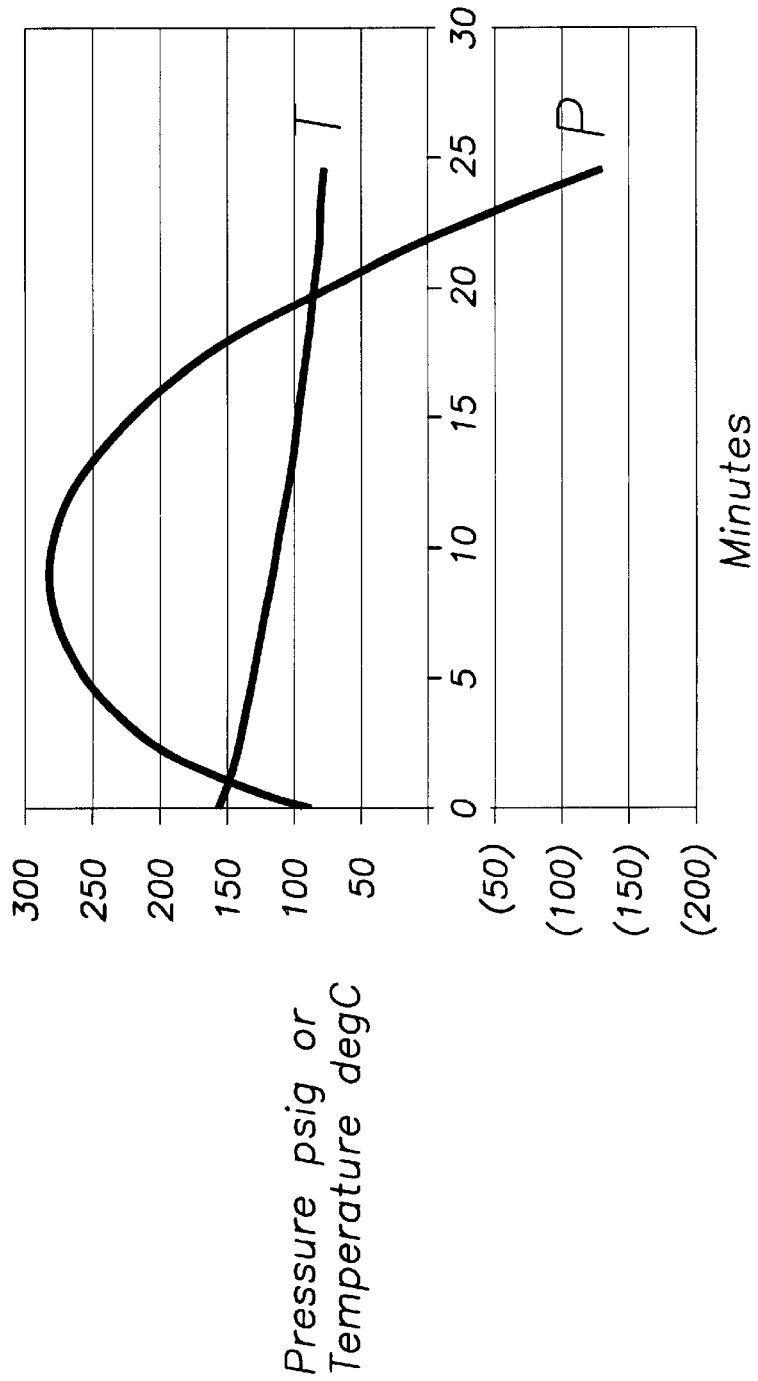
FIG. 2 is a graph showing the pressure and temperature relationships with time in the hydrolysis reactor when an instantaneous stoppage of ammonia demand occurs and the urea hydrolysis solution in the reactor is rapidly cooled by heat exchange in accordance with this invention.

By way of contrast, if the hydrolysis solution in the reactor is cooled by heat transfer according to this invention at the time of instantaneous stoppage of ammonia demand, the temperature of the hydrolysis solution (T) drops rapidly, FIG. 2, lower curve, which is accompanied by a quick pressure peak followed by a rapid pressure drop off, (P). The FIG. 2, upper curve, indicates that the production of gaseous ammonia in the system has essentially stopped.

Figure 3:
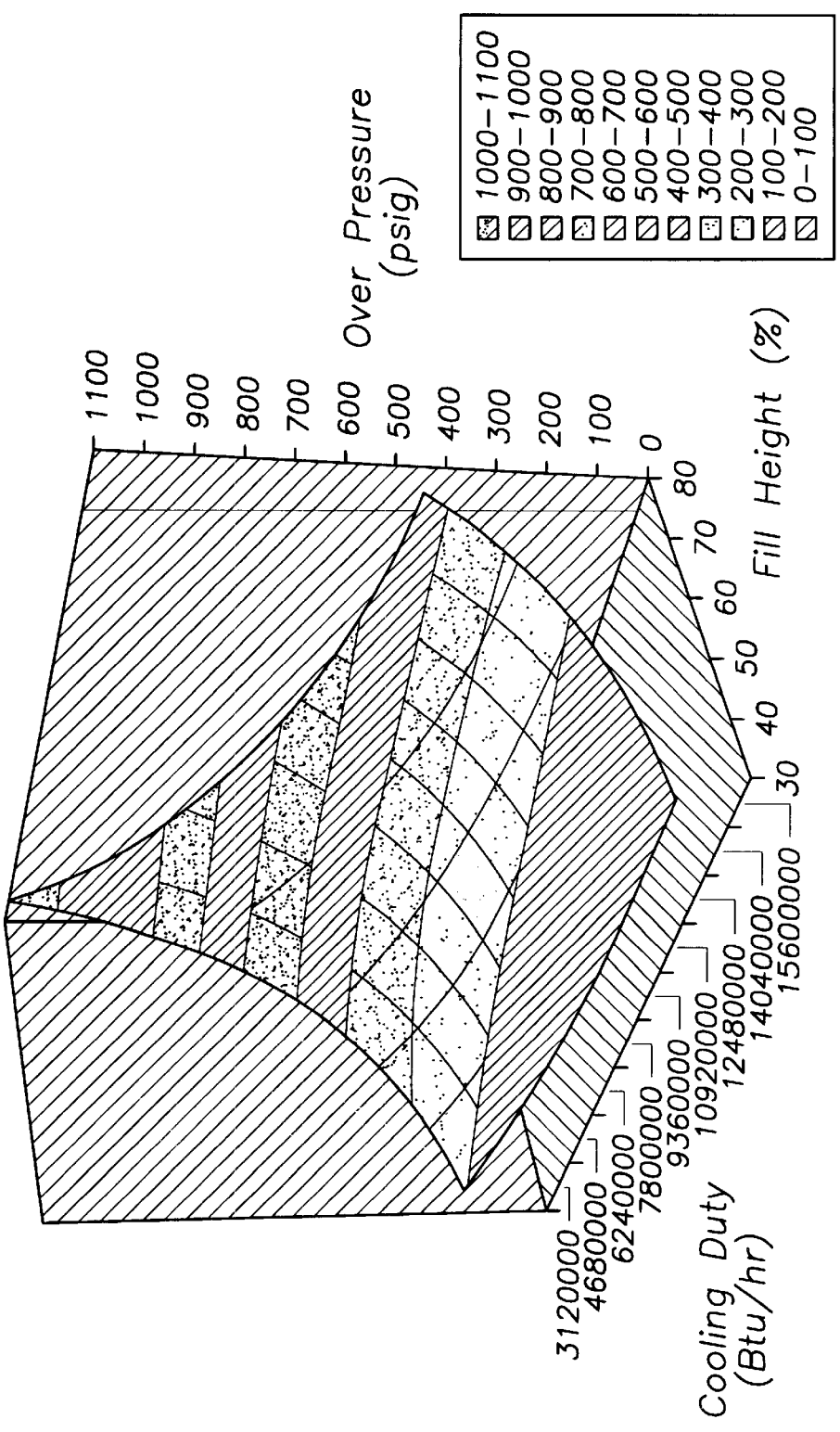
FIG. 3 is a 3-dimensional graph showing pressure in the reactor as a function of the cooling rate and as a function of liquid level in the reactor.

FIG. 3 shows an increase in gas volume with respect to the liquid volume decreases the amount of cooling required to limit the rise of pressure from the generation of ammonia and carbon dioxide gas by the residual heat in the reactor vessel and by the heat stored in the solution in the reactor vessel. This data shows that when the fill height (liquid level) exceeds 50 percent the pressure increases at a rapid rate.

Cooling of the hydrolysis solution in the reactor, according to this invention can be applied by several means including using the heating system in the reactor as a cooling system, providing a separate set of cooling coils in the reactor, or a heat exchanger outside the reactor through which the hot urea solution would be pumped and cooled by air or cooling fluid. In this way, when the demand for ammonia declines, the rate of generation of ammonia can be rapidly reduced in a closed system and without the withdrawal of any of the hot contents, whether liquid or gas, from the urea reaction vessel.

Figure 5:
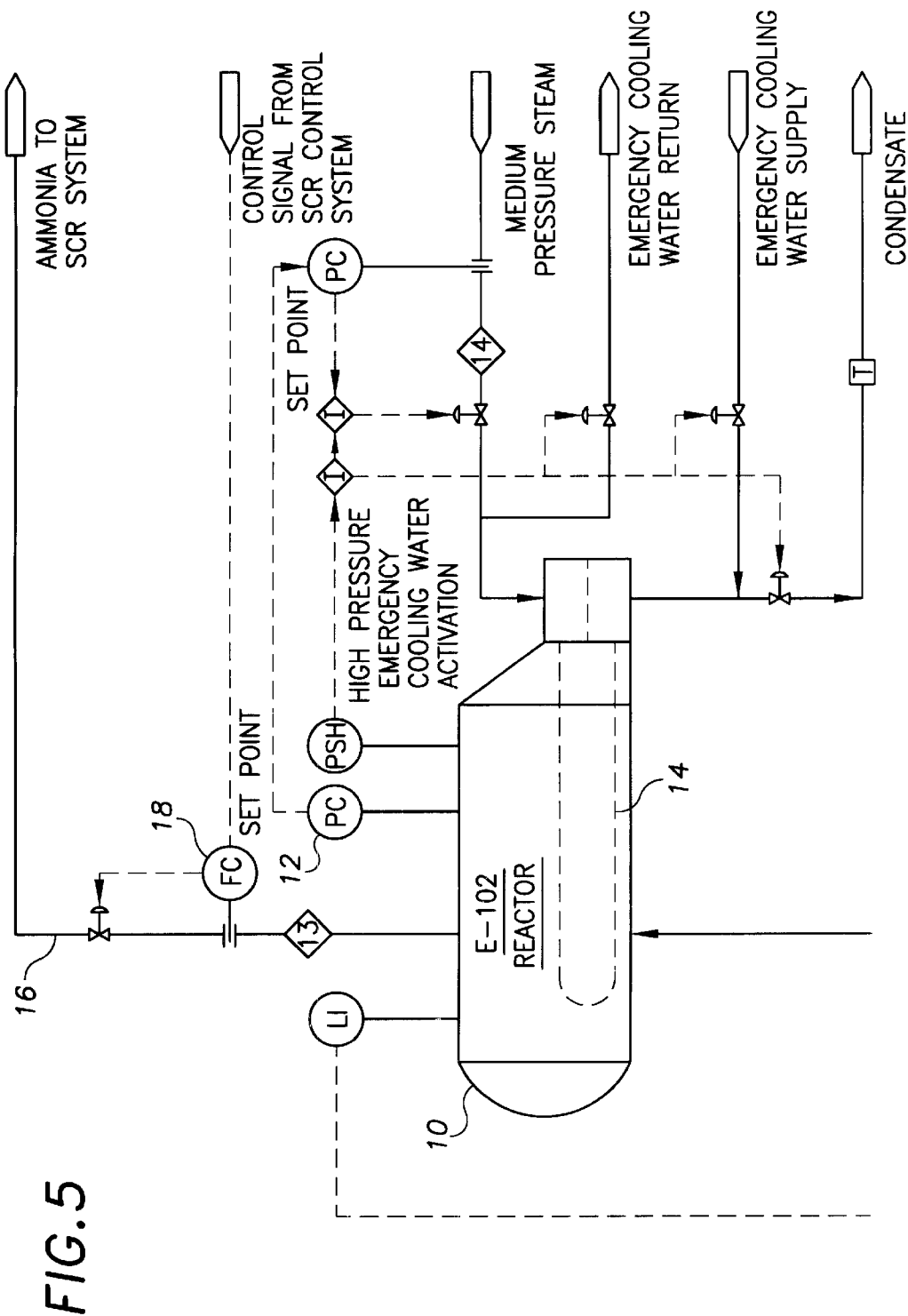
FIG. 5 is a schematic diagram of one embodiment of this invention.

Considering the preferred embodiment of FIG. 5 in more detail, in the reactor 10, the urea in the feed solution is first hydrolyzed to ammonium carbamate, which then decomposes into ammonia and carbon dioxide vapor. The water concentration will increase in the reactor until the water concentration is high enough to provide an equilibrium between the off-take and the feed solution. The urea hydrolysis reaction is endothermic and requires the input of heat. The heat input to the reactor for the hydrolysis and water evaporation is controlled to provide a constant gas pressure. The heat required for the reaction may be supplied in a number of different ways, such as electrical external resistance heaters, internal electric bayonet heaters, or internal coils using steam or heat transfer fluid. Normally, steam heating is used to provide the energy input for the hydrolysis reaction and is the method shown in the process flow diagram, FIG. 5. Steam pressures between 20 psig and 500 psig are typically used.

The reactor 10 is designed to operate at temperatures up to 300° C. and pressures up to 500 psig (the reactor is designed for a maximum pressure of 500 psig). Pressure controller 12 is configured to control the pressure in the reactor at a set point, depending on the required delivery pressure. The pressure in the reactor 10 is controlled by regulating the steam flow to the reactor coils 14. The pressure controller 12 is programmed to shut off the steam supply and to turn on the water-cooling supply if the pressure in the reactor exceeds 220 psig. As a backup, a pressure switch on the reactor is provided and hardwired to shutdown the steam supply and turn on the water-cooling system if the pressure exceeds 250 psig.

The ammonia/carbon dioxide vapor stream discharges from the top of the reactor and is routed in a pipeline 16 to the SCR system. The ammonia flow rate in the feed line is controlled by an ammonia demand set point signal from the SCR control system 18. The ammonia feed line is traced to maintain a temperature above 75° C. (Note: the $CO_2$ and $NH_3$ in the product gas can recombine at temperatures below 65° C. to form solid ammonium carbonate).

The preferred design is to use a ratio of the gas space to liquid space that it is large enough that the heat transfer of surface used to heat the reactor for the hydrolysis process is also adequate to provide the cooling transfer surface needed to remove heat from the reactor. Usually the preferred system will use as small a gas volume to liquid volume ratio as possible, on the order of 0.3 to 10. This ratio has to be consistent with the requirement that the pressure increase be limited to less than the design pressure of the reactor. The exact ratio for the preferred design depends on the cooling medium, the temperature of the medium, and fabrication economics for the reactor vessel. In practice, it is found that fill heights on the order of 40 to 60 percent provide the most economical design. A 50% fill height corresponds to gas to liquid volume ratio of 1.

Removing heat from the reactor vessel can be accomplished by a variety of means including circulating a cool fluid through the heat transfer tubes or coils used to heat the reactor, located internally or externally or by using a separate set of cooling coils. Cooling can also be accomplished, for example, when using an external heat exchanger equipped with cooling fins by blowing air or another medium across the cooling fins. With the proper design, the ammonia gas supply can be stopped instantaneously without having to discharge the reactor solution or gas stored in the reactor. This is important to prevent the potential release of toxic ammonia gas.

Figure 4:
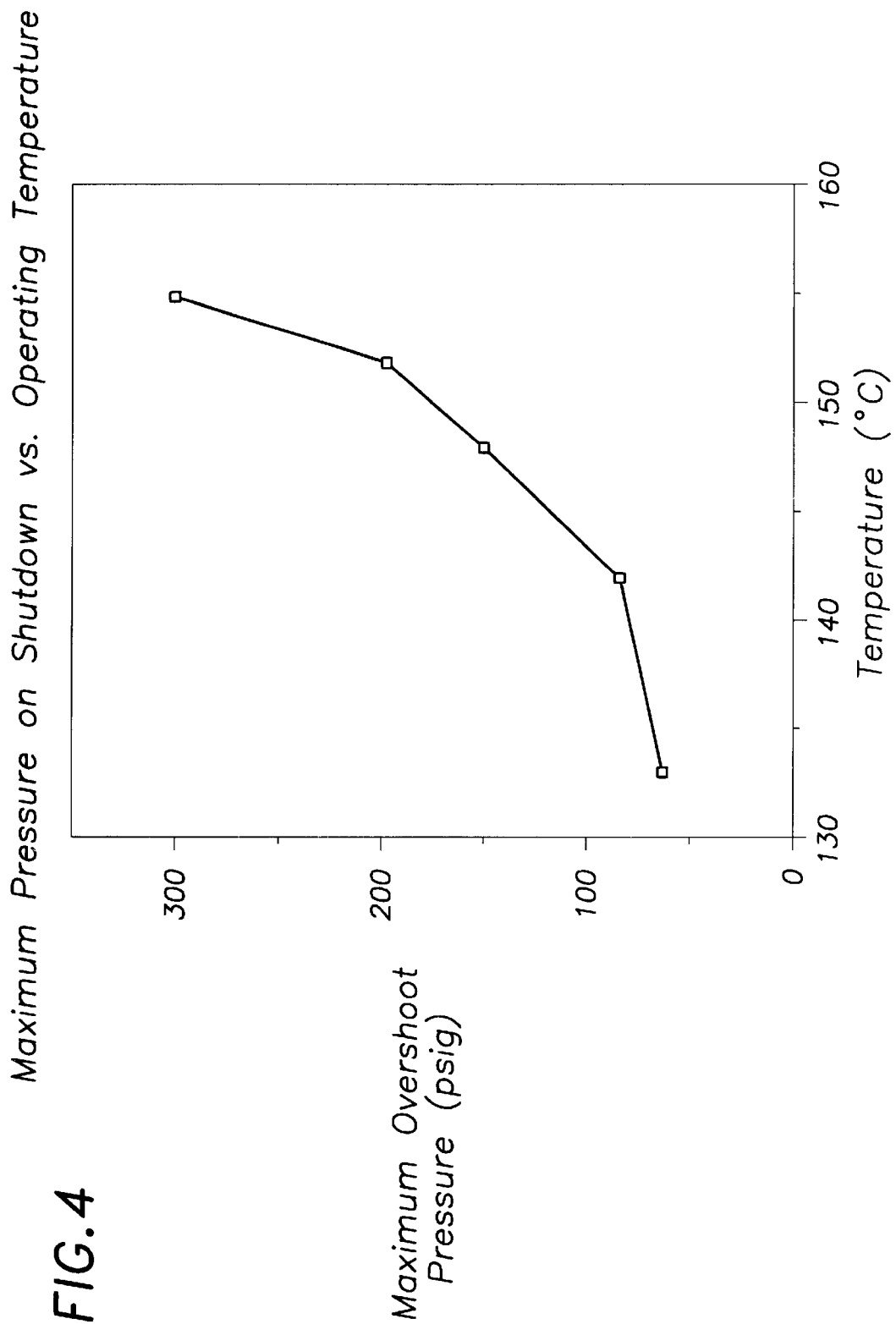
FIG. 4 shows the peak pressure in the reactor as a function of reactor operating temperatures without water-cooling for a reactor with a liquid to gas volume ratio of 1 to 2.3.

In addition to pressure activation, the preferred system also includes a shut off of this steam or other heating supply system and a turning on of the cooling system whenever there is in the sudden decrease in ammonia demand that closes the product off take gas line when the conditions in the reactor are such an overpressure would occur without removing heat from the reactor vessel and heat from the solution in the reactor. In normal operations, the heat stored in the reactor decreases with decreasing ammonia production. This is because as the ammonia supply rate decreases the operating temperature of the reactor also decreases. Shutting of the supply of ammonia from the reactor at lower temperatures results in less pressure increase as shown in FIG. 4 and decreases the cooling requirement. The activation procedure in the preferred system only turns on the cooling system when the heat stored in the reactor is at a high enough level that turning off the steam or other heat supply will not a prevent a pressure increase that results in discharge of liquid or gas from reactor without the removal of heat from the reactor solution.

Another activation mode for the cooling system is to continuously compute a running average of the change in pressure versus time and to compare the rate of pressure change against a maximum rate of pressure increase. If the rate is above the limit, the heating source to the reactor is turned off and the cooling system is turned on. This system allows the cooling system to be activated even in the case where a signal indicating that the ammonia gas off-take line had been closed is lost. It is desirable to activate the cooling system at the lowest possible pressure that does not effect normal operation of the urea to ammonia conversion system.

As an example, if a reactor designed to produce 500 lb/hr of ammonia from urea is generating ammonia with an operating temperature of 152 degrees C and the ammonia off-take is shutoff without first reducing the ammonia production, the cooling system is activated to remove heat from the reactor and to stop the production of ammonia. With adequate cooling the ammonia produced will recombine in the reactor with carbon dioxide and the pressure in the reactor will go negative with respect to atmospheric pressure. If the same reactor were operating at a reduced production rate such as with an operating temperature of 135 degrees C the cooling system would not be activated. The heat would just be turned off and the pressure allowed to stabilize.

Should the water-cooling system fail to prevent an over pressure, a pressure relief valve on the reactor, set for about 300 psig, is provided that discharges the solution into the feed tank or continuous dissolver. The pressure relief valve discharges into the solution feed tank below the low liquid level, which quickly cools the relieved liquid solution and/or gas and stops the generation of ammonia. The solution feed tank or continuous dissolver is provided with a low level switch that will shut down the reactor if the solution in the solution feed tank is less than the solution in the reactor. This insures that the reactor feed pump does not run out of solution, the reactor does not run dry and that there is always sufficient solution to cool the reactor solution in the case of an emergency over pressure.

We claim:

1. An improved process to provide a pressurized ammonia-containing gas stream useful for removing nitrogen oxides from a combustion gas stream which includes the steps of
    (a) hydrolyzing urea in aqueous solution in a closed reactor to evolve gaseous ammonia at a rate essentially balanced to the amount required to remove nitrogen oxides from the combustion gas stream; and
    (b) contacting said gaseous ammonia with said combustion gas stream;

the improvement wherein the pressure in the reactor is maintained within a preselected range when the demand for ammonia required for nitrogen oxide removal suddenly drops by cooling the solution within the hydrolysis reactor by heat exchange either within or external to the reactor in response to rapid changes in demand for ammonia required to remove said nitrogen oxides.

2. The process of claim 1 wherein said hydrolysis reactor contains a heat exchanger adapted for both heating and cooling said solution, the cooling of which is carried out by passing a cooling liquid through said heat exchanger.

3. The process of claim 1 wherein said hydrolysis reactor contains separate heating and cooling means, and heat exchange to cool said solution is carried out by passing a cooling liquid through said means.

4. The process of claim 1 wherein said hydrolysis reactor is provided with an external heat exchanger, and heat exchange to cool said solution is carried out by withdrawing said solution from said reactor, passing it through said external heat exchanger, and passing the cooled solution for further use in said reactor.

5. Process of claim 1 wherein said hydrolysis reactor is designed for gas-liquid ratios in the range of about 0.3 to 10.

6. The process of claim 1 wherein said hydrolysis reactor gas-liquid volume ratio is selected such that the heating surface provided for the hydrolysis reaction provides sufficient cooling surface for heat transfer to remove stored heat from the reactor.

7. The process of claim 1 where said hydrolysis reactor, equipped with a cooling system, is activated by a pressure switch when the reactor pressure reaches a fixed rate.

8. The process of claim 1 where said hydrolysis reactor is equipped with a cooling system which is activated when the reactor is above a preset fixed temperature when the ammonia gas off-take line is closed.

9. The process of claim 1 where said hydrolysis reactor is equipped with a cooling system that is activated by both the operating pressure and temperature of the reactor when the ammonia gas off-take line is closed.

10. The process of claim 1 where said hydrolysis reactor is equipped with a cooling system that is activated by the rate of pressure increase in the reactor that exceeds a predetermined value.

11. An improved process to provide a pressurized gas stream useful for removing nitrogen oxides from a combustion gas stream by SNCR (Selective Non-Catalytic Reduction), or SCR (Selective Catalytic Reduction), which comprises the steps of:

a) feeding an aqueous solution of urea or mixtures of urea containing biuret and/or ammonium carbamate, having a concentration of about 1% to about 76% by weight of solids into a reactor and hydrolyzing the urea therein at temperatures of at least 110° C. up to about 300° C. and under pressures of about 20–500 psig, the temperature or pressure of the reaction mixture normally being controlled by the input of heat to the reactor to produce a gaseous product stream of ammonia, carbon dioxide and water at a rate sufficient for external use in step d), and a residual liquid phase reaction medium containing unreacted urea, biuret and/or ammonium carbamate;

b) separating the gaseous product stream at a controlled pressure and flow rate;

c) retaining the liquid phase reaction medium in the reactor for further conversion to gaseous ammonia and carbon dioxide, and/or recycling at least a portion of the reaction medium back into the reactor, a urea dissolver, or the feed solution to the reactor for further conversion; and d) withdrawing the gaseous ammonia and carbon dioxide-containing product stream and feeding it for external use at a controlled rate which is approximately the amount necessary for the demands of said external use in removing said nitrogen oxides;

the improvement wherein the pressure in the reactor is maintained within the recited range when the demand for ammonia for said external use suddenly drops by cooling the solution within the hydrolysis reactor by heat exchange either within or external to the reactor in response to rapid changes in demand for ammonia required to remove said nitrogen oxides.

12. Process of claim 11 wherein said hydrolysis reactor is designed for gas liquid ratios in the range of about 0.3 to 10.

13. The process of claim 11 wherein said hydrolysis reactor gas-liquid volume ratio is selected such that the heating surface provided for the hydrolysis reaction provides sufficient cooling surface for heat transfer to remove stored heat from the reactor.

14. The process of claim 11 where said hydrolysis reactor, equipped with a cooling system, is activated by a pressure switch when the reactor pressure reaches a fixed rate.

15. The process of claim 11 where said hydrolysis reactor is equipped with cooling system which is activated when the reactor is above a preset fixed temperature when the ammonia gas off-take line is closed.

16. The process of claim 11 where said hydrolysis reactor is equipped with a cooling system that is activated by both the operating pressure and temperature of the reactor when the ammonia gas off-take line is closed.

17. The process of claim 11 where said hydrolysis reactor is equipped with a cooling system that is activated by the rate of pressure increase in the reactor that exceeds a predetermined fixed value.

18. The process of claim 11 wherein said hydrolysis reactor contains a heat exchanger adapted for both heating and cooling said solution, the cooling of which is carried out by passing a cooling liquid through said heat exchanger.

19. The process of claim 11 wherein said hydrolysis reactor contains separate heating and cooling means, and heat exchange to cool said solution is carried out by passing a cooling liquid through said means.

20. The process of claim 11 wherein said hydrolysis reactor is provided with an external heat exchanger, and heat exchange to cool said solution is carried out by withdrawing said solution from said reactor, passing it through said external heat exchanger, and passing the cooled solution for further use in said reactor.

* * * * *